F. W. WAKEFIELD.
LIGHTING FIXTURE.
APPLICATION FILED JULY 7, 1911.
1,054,951.
Patented Mar. 4, 1913.
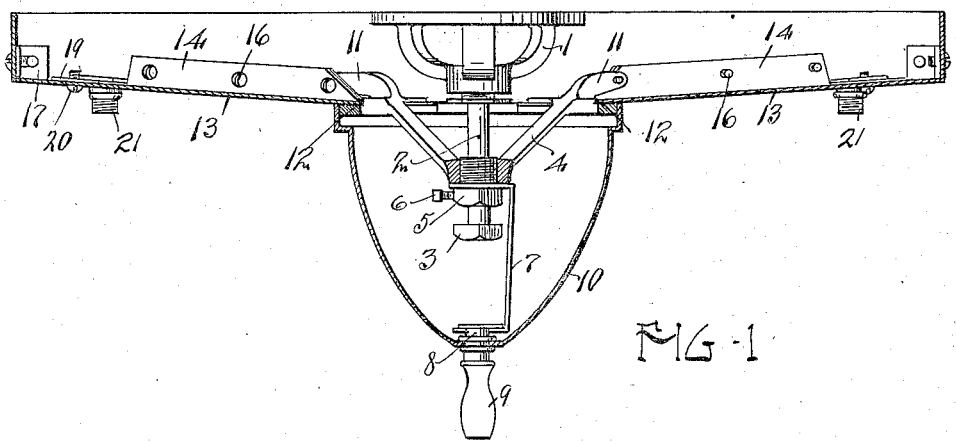
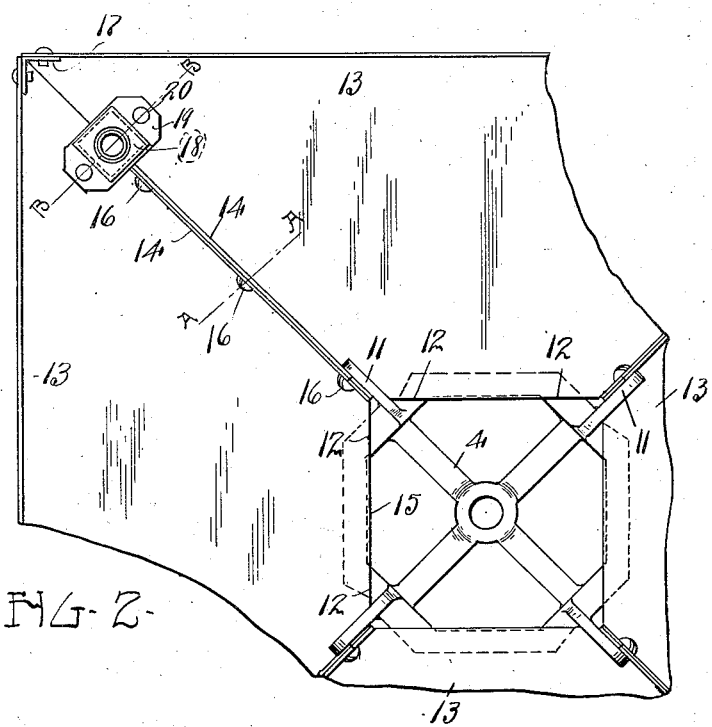
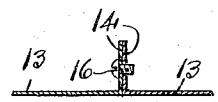
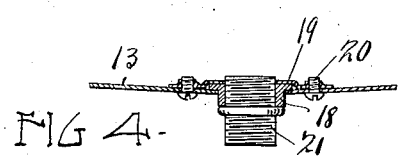
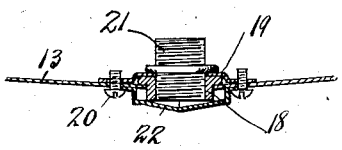
WITNESSES
INVENTOR
Frederick W. Wakefield
BY J. B. Fay
ATTORNEY

UNITED STATES PATENT OFFICE.

FREDERICK W. WAKEFIELD, OF VERMILION, OHIO, ASSIGNOR TO THE F. W. WAKEFIELD BRASS COMPANY, OF VERMILION, OHIO, A CORPORATION OF OHIO.

LIGHTING-FIXTURE.

1,054,951.  Specification of Letters Patent.  Patented Mar. 4, 1913.

Application filed July 7, 1911. Serial No. 637,244.

*To all whom it may concern:*

Be it known that I, FREDERICK W. WAKEFIELD, a citizen of the United States, and a resident of Vermilion, county of Erie, and State of Ohio, have invented a new and useful Improvement in Lighting-Fixtures, of which the following is a specification, the principle of the invention being herein explained and the best mode in which I have contemplated applying that principle, so as to distinguish it from other inventions.

My invention relates in general to lighting fixtures and its general object is the provision of an improved canopy to which a number of individual lights may be secured, and the invention will find its chief application in electric fixtures.

To the accomplishment of these and related ends said invention then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—Figure 1 is a vertical section of a fixture embodying my invention; Fig. 2 is a top plan view, partly broken away, of the canopy alone; Fig. 3 is a section on the line A—A, in Fig. 2; Fig. 4 is a section on the line B—B in Fig. 2; Fig. 5 is a section on the line B—B in Fig. 2 with one of the parts in different position than in Fig. 4 and showing a cover plate; Fig. 6 is a perspective view of the cover plate.

The canopy may be supported from the wall or ceiling in any convenient manner, but in the drawings there is illustrated a crow's-foot 1 which is attached to the ceiling and from which is suspended a rod 2 bearing a head 3 at its lower end. The canopy is supported from the rod 2 by a supporting member 4 which enters into the construction of the canopy. Below the supporting member 4 is a nut 5 bearing a set screw 6 by means of which the member 4 may be secured in any desired position on the rod 2; the nut 5 supports a bracket 7 bearing a nipple 8, and by means of a nut 9 threaded on the nipple a second canopy 10 is supported below the main canopy so as to conceal certain parts entering into the construction of the fixture.

The main canopy may be of any desired shape, but of whatever shape it may be, I propose to make it out of a plurality of similar sections. Canopies of this sort are usually made of sheet brass or other sheet metal, and it has been usual to make them of one piece of metal. By making them out of a plurality of similar sections, as in the present invention, a considerable saving of material is had, because the different sections may be stamped reversely from a single sheet of metal. Furthermore, after these sections have been stamped, they may each be polished separately toward the center so that the finished fixture will be much more elegant in appearance.

The several sections which form the canopy proper are supported from the member 4 which is formed with a plurality of ribs 11 and adjacent to each of the ribs 11 are formed outwardly facing shoulders 12. The sections 13 of the canopy are formed at their meeting edges with flanges 14 and in assembling the fixture, the inner edges 15 of the sections 13 are fitted into the shoulders 12. Screws or other retaining means 16 are then utilized to secure adjacent flanges 14 together and to secure these flanges to the respective ribs 11. It may be desirable to further tie together the outer extremities of adjacent sections 13, and for this purpose I employ angles 17 secured to the sections 13.

In order that individual lamps may be supported from the canopy, I provide any desired number of nipples which may be conveniently held in the canopy by a plate 19 which covers the flanged end of the nipple 18, this plate being secured to the canopy by screws 20. These nipples are preferably attached to the canopy on the meeting lines of the sections as clearly shown in Fig. 2, for by this means additional strength is given to the canopy. The nipples 18 are preferably interiorly threaded and when a lamp is to be attached at a given nipple, a coupling 21 is threaded into the nipple 18 and to the lower end of the coupling may be secured a lamp socket. This position of the parts is illustrated in Fig. 4. It is often desirable, however, that more or less lights be secured to a canopy, and therefore it is at times desirable to conceal nipples which it is not desired to use. In such case the coupling 21 may be threaded into the nipple 18 from the inner side of the canopy and the outer end of the nipple may be concealed by an ornamental plate 22 which is provided at its ends with recesses 23 which may engage under the heads of the screws 20.

From this description of my invention its many detailed advantages should be apparent and as a whole it provides an ornamental fixture which lends itself admirably to manufacture, and which may be quickly assembled as a fixture having different desired numbers of individual lights. The provision of flanges along the meeting edges of the sections and the securing together of such flanges provides, in effect, a series of radiating ribs or trusses for the canopy structure. As these ribs extend from the central supporting member to the nipples 18, they will be seen to be admirably adapted to take up the bending strain, which the weight of the lamps and their connections impose upon the canopy, unsupported as the latter is, save at its center. The unsightly deflection of the outer edge of the canopy, leaving a space between it and the ceiling is thus entirely avoided. The advantages just described will still be enjoyed, even though the lamps be suspended at points intermediate between the aforesaid ribs. This may be found desirable, or necessary as for instance where more lamps are suspended from the canopy than there are ribs to the latter.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a lighting fixture, a canopy, comprising a central supporting member provided with a plurality of radially extending ribs, a plurality of similar sheet metal sections, the meeting edges of said sections extending radially from said member and being provided with flanges, means securing together the adjacent flanges, and means securing said flanges to the respective ribs.

2. In a lighting fixture, a canopy, comprising a supporting member provided with a plurality of ribs and with outwardly facing shoulders adjacent said ribs, a plurality of similar sections having their inner edges engaging said shoulders, said sections being provided with flanges at their meeting edges parallel to the respective ribs, means securing together the adjacent flanges, and means securing the flanges to the respective ribs.

3. In a lighting fixture, the combination of a central supporting member, a plurality of similar sheet metal sections removably secured to said member, and a plurality of nipples secured to said sections.

4. In a lighting fixture, the combination of a central supporting member, a plurality of similar sheet metal sections removably secured to said member, a plurality of nipples removably secured to said sections, and removable means for covering unused nipples.

5. In a lighting fixture, the combination of a supporting member, a plurality of similar sections removably secured to said member, a plurality of nipples removably secured in said sections, plates provided with recesses at their ends and adapted to cover unused nipples, and screws engaging said recesses and threaded into said sections.

6. In a lighting fixture, the combination of a supporting member provided with a plurality of ribs and with outwardly facing shoulders adjacent said ribs, a plurality of similar sections having their inner edges engaging said shoulders, said sections being provided with flanges at their meeting edges parallel to the respective ribs, means securing together the adjacent flanges, means securing the flanges to the respective ribs, a plurality of nipples removably secured in said sections, plates for covering unused nipples, and means for removably securing said plates to said sections.

Signed by me this 5th day of July, 1911.

FREDERICK W. WAKEFIELD.

Attested by—
 GERALD L. BASIL,
 GEORGE MAPES.